UNITED STATES PATENT OFFICE.

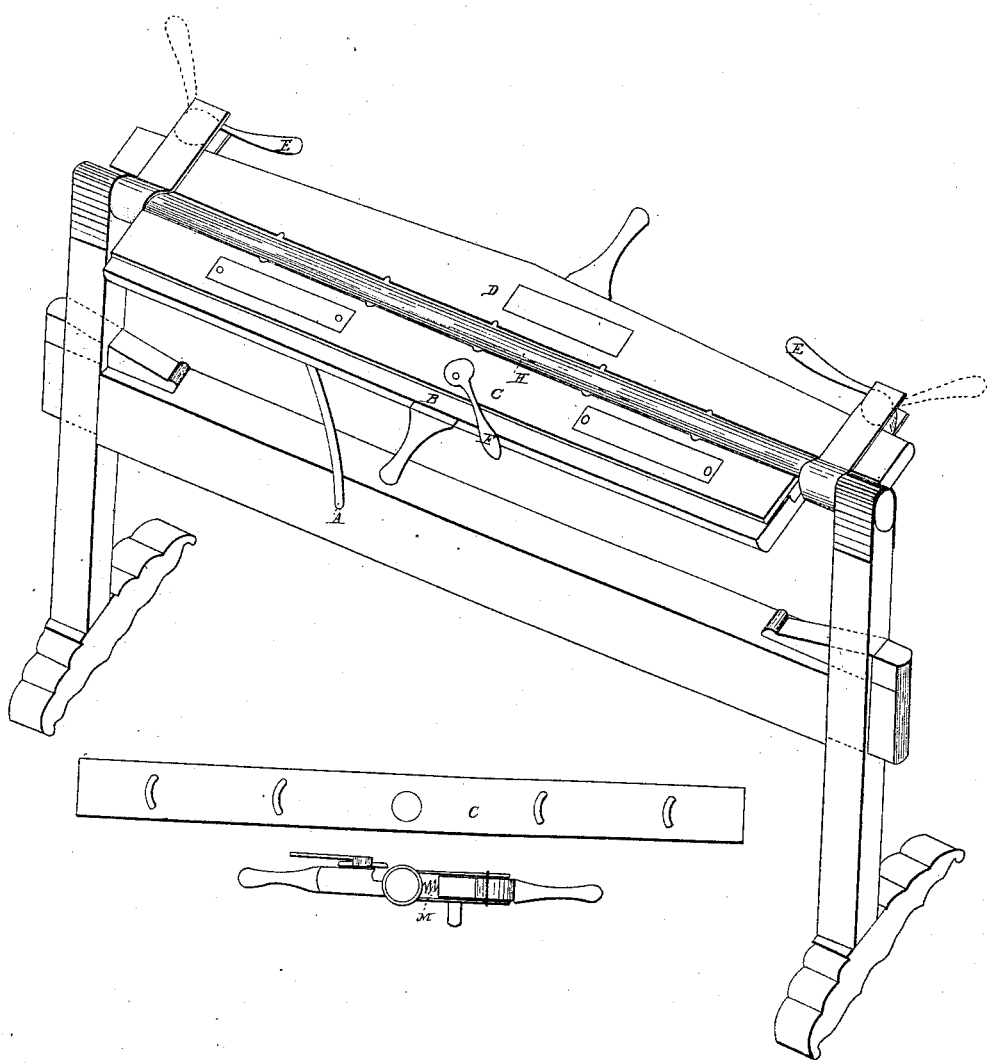

LOOMIS MANN, OF IONIA, MICHIGAN.

IMPROVED MACHINE FOR MAKING EAVES-TROUGHS.

Specification forming part of Letters Patent No. 27,916, dated April 17, 1860.

*To all whom it may concern:*

Be it known that I, LOOMIS MANN, of Ionia, in the county of Ionia, in the State of Michigan, have invented a new and useful Machine for Manufacturing Tin Eaves-Troughs; and I do hereby declare that the following is a full, clear, and exact description of the construction and operation of the same, reference being had to the annexed drawings, making a part of this specification, in which—

Figure 1 is a perspective view; Fig. 2, a longitudinal elevation; and Fig. 3 shows a face-plate representing the scallops on the front edge to correspond with scallops on movable bar D, which scallops are made for the purpose of letting the soldering-iron pass to the edge of the tin, so as to solder the entire length of the seam.

The metallic rest A is used for holding the bed-piece B level while inserting the tin. The bed-piece B has a groove on top, into which the tin is inserted. The face-plate C is moved by eccentric F over the groove to hold or confine the tin in the groove. Movable bar D is used to press the tin to the roller H, and to form the trough, as also to hold the same until soldered. The eccentrics E E at each end of movable bar D are used to press movable bar D down upon the tin. The coil-springs G G, at each end of movable bar D, are used to raise the said bar, and to hold the same from the roller H while the trough is removed and more tin inserted.

Directions for using: First, raise metallic rest A upright or perpendicular; second, place bed-piece B on rest A; third, move face-plate C back by turning eccentric F to the left hand; fourth, move movable bar D over face-plate C; fifth, turn eccentrics E E over and out—one to the right, the other left; sixth, insert six sheets of tin into groove in bed-piece B; seventh, move face-plate C over the head on tin by turning the eccentric F to the right hand; eighth, turn eccentrics E E over and in toward operator; ninth, take the handle on bed-piece B in the left hand and the handle on movable bar D in the right hand, then force the movable bar D over from the operator until the edge of the tin is seen through the scallops; tenth, move the rest A toward the left to a horizontal position, leaving roller and tin in a rolling condition for soldering.

The peculiar advantages of my machine over all others now in use are, first, in the facility of operating it, arising mainly from the arrangement of the roller H and bar D for operating by levers from their mid-length, so that the workman does not change his position from the time of putting the prepared tin into the machine until it is formed, soldered, and taken out; and, secondly, by notching the edges of the face-plate C and the bar D, which retain the trough on the roller H, where they cross the lap of the plates, by which the workman is enabled to solder the entire length of the seam while on the former, thus avoiding the necessity of handling to finish the work after taking it out of the machine, and the liability of straining it out of line by such procedure.

Having thus described my invention, what I claim as new, and desire to secure by Letters Patent, is—

1. The wing or bed piece B and clamping-plate C, rigidly attached to the roller H, forming a lever thereto, operating in combination with the movable bar D, in the manner and for the purposes set forth.

2. Notching the edges of the bar D and clamping-plate C where they cross the lap of the plates to admit of their being soldered from edge to edge while in the machine, substantially as specified.

LOOMIS MANN. [L. S.]

Witnesses:
C. OSCAR THOMPSON,
A. R. CORNELL.